(12) United States Patent
Hayes et al.

(10) Patent No.: US 6,298,882 B1
(45) Date of Patent: Oct. 9, 2001

(54) EXPLOSION RESISTANT BLANKET FOR FLOW LINE

(75) Inventors: Glenn P Hayes, Hurst; Mark D. Matzner, Burleson, both of TX (US)

(73) Assignee: SPM, Inc., Fort Worth, TX (US)

( * ) Notice: Subject to any disclaimer, the term of this patent is extended or adjusted under 35 U.S.C. 154(b) by 0 days.

(21) Appl. No.: 09/560,049

(22) Filed: Apr. 27, 2000

Related U.S. Application Data

(60) Provisional application No. 60/131,060, filed on Apr. 26, 1999.

(51) Int. Cl.[7] .................................................. F16L 58/18
(52) U.S. Cl. .............................. 138/99; 138/110; 138/149
(58) Field of Search ........................... 138/99, 110, 97, 138/149; 285/393

(56) References Cited

U.S. PATENT DOCUMENTS

| | | | |
|---|---|---|---|
| 2,924,546 | * | 2/1960 | Shaw .................................. 138/99 X |
| 3,531,345 | * | 9/1970 | Torosian ............................. 138/99 X |
| 3,563,276 | * | 2/1971 | Hight ..................................... 138/99 |
| 4,181,157 | * | 1/1980 | DeCamp ............................. 138/126 |
| 4,930,543 | * | 6/1990 | Zuiches ............................... 138/110 |
| 5,027,862 | * | 7/1991 | Laybourn .............................. 138/99 |
| 5,617,900 | * | 4/1997 | Weil ..................................... 138/127 |
| 5,632,307 | * | 5/1997 | Fawley et al. ......................... 138/99 |
| 5,713,394 | * | 2/1998 | Nygaard .............................. 138/149 |
| 5,732,743 | * | 3/1998 | Livesay ................................. 138/99 |
| 5,814,387 | * | 9/1998 | Orihara et al. ..................... 138/99 X |
| 5,894,864 | * | 4/1999 | Rich ....................................... 138/99 |
| 6,102,076 | * | 8/2000 | Romero, Jr. et al. ............. 138/96 R |

* cited by examiner

*Primary Examiner*—Patrick Brinson
(74) *Attorney, Agent, or Firm*—Bracewell & Patterson, L.L.P.

(57) ABSTRACT

An explosion resistant blanket for a flow line component having a plurality of flexible inner layers constructed from a high tensile strength material. A flexible cover layer covers the inner layers and is constructed from a material that is resistant to degradation from ultraviolet light and that is water resistant. Elongate straps are attached to the inner and cover layers that wrap around the pipeline component and secure the blanket to the component.

12 Claims, 2 Drawing Sheets

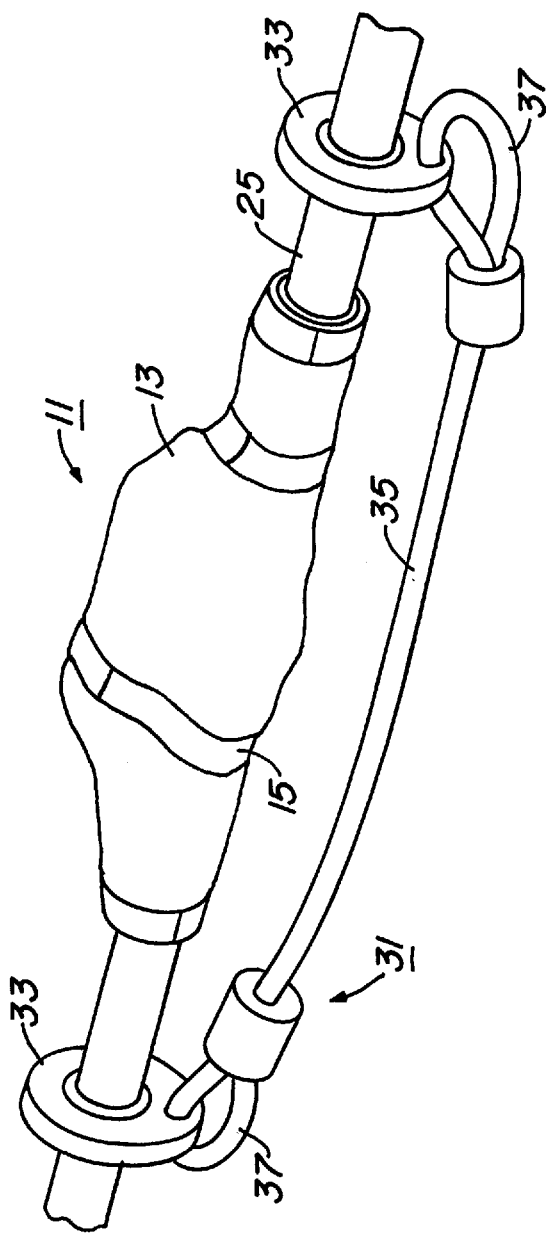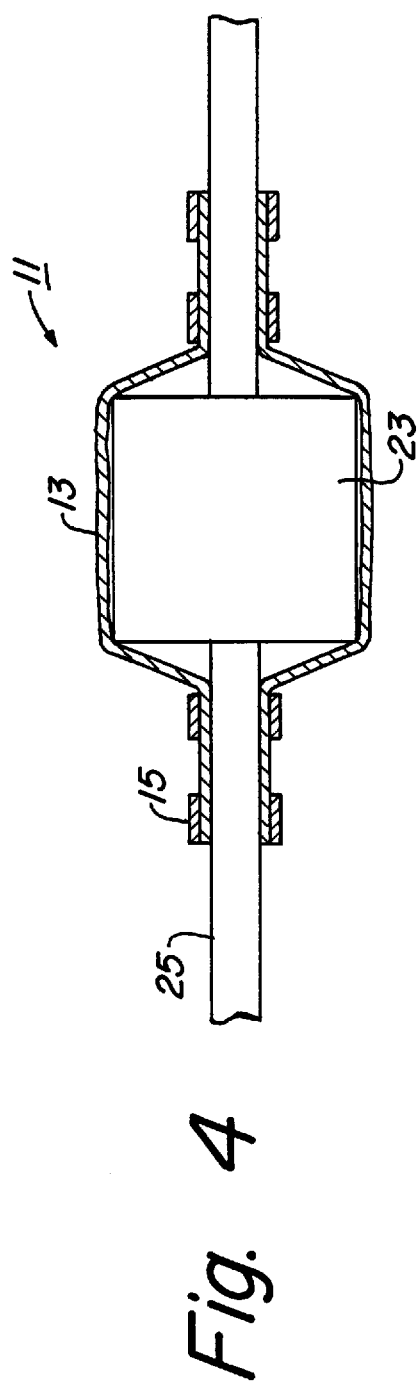

EXPLOSION RESISTANT BLANKET FOR FLOW LINE

CROSS-REFERENCE TO RELATED APPLICATIONS

This application claims the benefits of provisional application serial number 60/131,060 filed on Apr. 26, 1999, in the United States Patent and Trademark Office.

TECHNICAL FIELD

This invention relates in general to safety equipment for high pressure flow lines, and in particular to an explosion resistant blanket wrap for covering individual components or union connections in a high pressure flow line.

BACKGROUND OF THE INVENTION

In high pressure flow lines and related components, an explosion or rupture of the line can propel metal shards or broken components outward at such a speed as to make the flying debris dangerous to nearby workers. In many cases the workers must work in close proximity to the high pressure lines and it is impossible to maintain a safe distance. Thus, the pipeline owner should take precautions to protect the workers.

One way to protect workers from the debris of an explosion or rupture of a flow line is to wrap the line and component in a protective blanket. These blankets are usually high strength material held on by clamps or the like. The high strength materials suitable for this application tend to deteriorate when subjected to moisture and the ultraviolet spectrum of sunlight. However, since the protected flow lines are commonly outside, moisture and ultraviolet light are prevalent and the blankets deteriorate quickly. Further the clamps which hold the blankets to the flow lines are usually metal, which over time can rust and make it difficult to remove the clamps to replace the blanket.

Therefore, there is a need for a safety blanket that is water and ultraviolet light resistant. Further that blanket should include provisions for attachment to the pipeline component that are weather resistant.

SUMMARY OF THE INVENTION

The present invention is drawn to a device to contain an explosion or rupture at a component of a pipeline. The device has a flexible blanket sized to wrap closely around the component. The blanket has a plurality of flexible internal layers constructed of a high tensile strength material and a flexible cover layer on an outer surface of the blanket constructed of a water resistant material. A plurality of elongate straps are joined to the blanket and adapted to wrap around the blanket and the component and secure the blanket to the component.

The cover layer is resistant to degradation from ultraviolet light. The cover layer is constructed from vinyl or nylon. The straps are secured with metal floating bar buckle fastener. The internal layers are constructed of a para-aramid fibre. The device further comprises an inner cover layer on an inside surface of the blanket. The inner cover layer encapsulates the internal layers between the covers, and is constructed of a water resistant material. The straps are retained to the blanket by stitching that extends through all of the layers. The device further includes a pair of clamps removably coupled to the pipeline adjacent the component. A cable is attached to the clamps to retain the clamps in relation upon separation of the pipeline between the clamps.

BRIEF DESCRIPTION OF DRAWINGS

FIG. 3 is a schematic, isometric drawing of the blanket of FIG. 1 shown installed on a component in a flow line having an auxiliary safety clamp.

FIG. 4 is a schematic, sectional side view of the blanket of FIG. 1 shown installed around a component in a flow line.

BEST MODE FOR CARRYING OUT THE INVENTION

Figure 1:
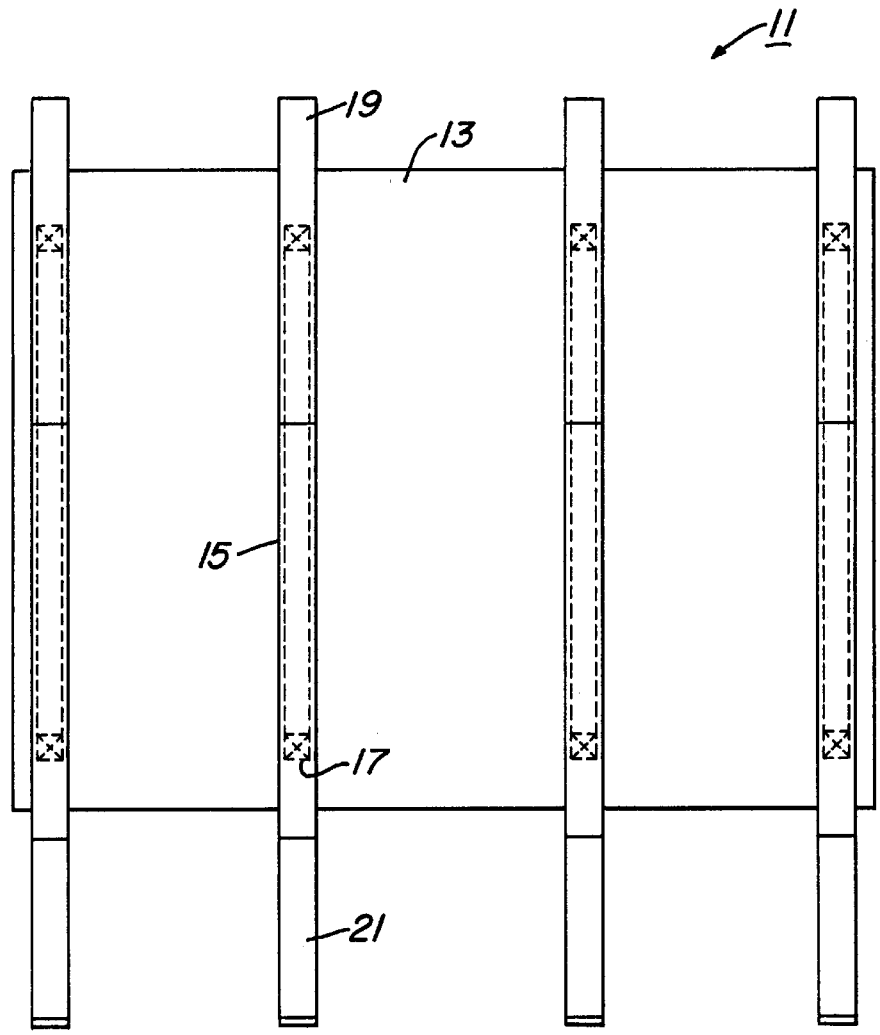
FIG. 1 is a plan view of a blanket constructed in accordance with the invention.
Figure 2:
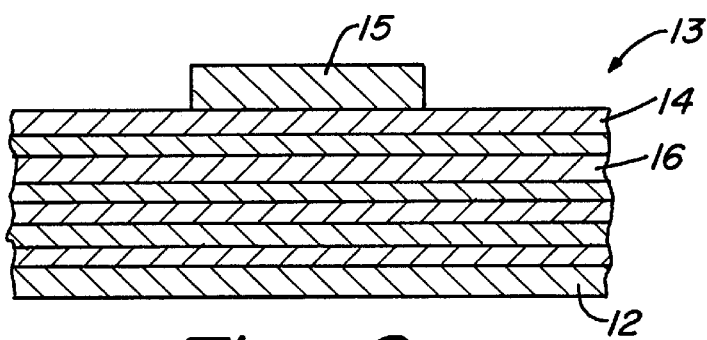
FIG. 2 is an enlarged sectional side view of the blanket of FIG. 1.

Referring to FIG. 1, a flow line safety blanket 11 is shown. Blanket 11 comprises a flat, rectangular body 13 that is approximately four feet long and three feet wide, although body 13 may be formed into many different shapes, sizes and thicknesses. Body 13 is formed from several layers of fabric-like material. In one embodiment (FIG. 2), body 13 has an inner cover layer 12, an outer cover layer 14, and approximately six, thin insulative layers 16 therebetween. The cover layers 12, 14 are formed from vinyl, nylon or equivalent cloth with UV and water resistant characteristics. Each of the insulative layers 16 is preferably formed from coarsely woven para-aramid fibre such as DuPont KEVLAR. The preferred embodiment utilizes, 1420 denier "KEVLAR 129" sheet fabric, style 20, having a weight of 7.7 oz/yd, a thickness of 0.014 in, with a count of 20×20 ends/in, and tensile warp and fill of 750 and 800 lbf/in respectively. The para-aramid fibre should also be treated to be water resistant. Such treatment may be any water resistant treatments known to those skilled in the art, but preferably is a HEXEL CS-897 treatment consisting of an emulsified florochemical combined with a melamine extender. Other types and strengths of insulative layers my be utilized.

Blanket 11 also comprises a plurality of flat, elongated straps 15 that are affixed to body 13 on its outer layer 14. Straps 15 are preferably joined to body 13 with stitching 17 of a para-aramid thread, such as DuPont KEVLAR, that extends through each of its eight layers 12, 14, 16. In the embodiment shown, one strap 15 is located on each lateral end of body 13, and two straps are located symmetrically therebetween. Each strap 15 is about two inches wide, four feet long, and formed from a nylon web strap material. As shown in FIG. 1, straps 15 are offset on body 13 such that one of their ends is longer than the other. Each of the short ends of straps 15 has a metal floating bar buckle fastener 19 adapted to receive and secure the longer end of its respective strap 15.

In operation (FIGS. 3 and 4), blanket 11 is designed to be placed around an individual component 23, typically a union or other connection in a high pressure flow line 25, including applications with pressures in the range of 10 to 15 kpsi. Component 23 is shown schematically, and in addition to connectors, it could also comprise a valve or other flowline device. With straps 15 on the outside, blanket 13 is wrapped around component 23 such that no surface or portion of component 23 is left exposed. Overlapping more than a slight amount is not necessary. Straps 15 are then tightly wound around component 23 and/or flow line 25 to secure blanket 23 in place. Straps 15 are installed so that they extend completely around component 23 in 360 degrees of direction. In the event of an explosion or rupturing at component 23, blanket 11 is designed to contain any debris at the source and help prevent items caused by the rupture such as metal shards or broken components from being discharged in a way that would endanger personnel.

Blanket 11 is ideally suited for use in conjunction with a safety restraint 31 (FIG. 3). Safety restraint 31 is described in U.S. Pat. No. 5,689,862, which is incorporated herein by reference. Safety restraint comprises a pair of clamps 33, each of which is removable coupled to flow line 25 on one side of component 23. A steel cable 35 with a loop 37 on each end is connected to each clamp 33. In case flow line 25 ruptures or breaks at component 23, the anchored steel cable 35 will prevent the uncontrolled flailing or movement of the ends of flow line 25 by means of clamps 33.

The invention has several advantages. The blankets offer a simple, lightweight, compact design that is easily installed and readily adaptable to many different applications. Each blanket has a durable cover and multiple, explosion resistant interior layers. The exterior is easy to clean and has superior abrasion and tear resistance along with maximum water and UV resistance. The straps are high strength and employ industrial grade fasteners to secure and retain the blanket in place. The blankets provide an excellent, inexpensive way to add safety to field piping systems.

Although the invention has been shown in only one of its forms, it should be apparent to those skilled in the art that it is not so limited, but is susceptible to various changes without departing from the scope of the invention.

We claim:

1. A device to contain an explosion or rupture at a component of a pipeline, comprising:
    a flexible blanket sized to wrap closely around the component, the blanket having a plurality of flexible internal layers constructed of a high tensile strength material and a flexible outer cover layer on an outer surface of the blanket constructed of a water resistant material;
    a plurality of elongate straps joined to the blanket and adapted to wrap around the blanket and the component and secure the blanket to the component; and
    wherein the cover layer is resistant to degradation from ultraviolet light.

2. A device to contain an explosion or rupture at a component of a pipeline, comprising:
    a flexible blanket sized to wrap closely around the component, the blanket having a plurality of flexible internal layers constructed of a high tensile strength material and a flexible outer cover layer on an outer surface of the blanket constructed of a water resistant material;
    a plurality of elongate straps joined to the blanket and adapted to wrap around the blanket and the component and secure the blanket to the component; and
    wherein the cover layer is constructed of a material selected from the group consisting of vinyl and nylon.

3. A device to contain an explosion or rupture at a component of a pipeline, comprising:
    a flexible blanket sized to wrap closely around the component, the blanket having a plurality of flexible internal layers constructed of a high tensile strength material and a flexible outer cover layer on an outer surface of the blanket constructed of a water resistant material;
    a plurality of elongate straps joined to the blanket and adapted to wrap around the blanket and the component and secure the blanket to the component; and
    wherein the internal layers are constructed of a para-aramid fibre.

4. A device to contain an explosion or rupture at a component of a pipeline, comprising:
    a flexible blanket sized to wrap closely around the component, the blanket having a plurality of flexible internal layers constructed of a high tensile strength material and a flexible outer cover layer on an outer surface of the blanket constructed of a water resistant material;
    a plurality of elongate straps joined to the blanket and adapted to wrap around the blanket and the component and secure the blanket to the component; and
    an inner cover layer on an inside surface of the blanket, encapsulating the internal layers between the covers, the inner cover being constructed of a water resistant material.

5. A device to contain an explosion or rupture at a component of a pipeline, comprising:
    a flexible blanket sized to wrap closely around the component, the blanket having a plurality of flexible internal layers constructed of a high tensile strength material and a flexible outer cover layer on an outer surface of the blanket constructed of a water resistant material;
    a plurality of elongate straps joined to the blanket and adapted to wrap around the blanket and the component and secure the blanket to the component; and
    wherein the straps are retained to the blanket by stitching with a para-aramid fibre thread that extends through all of the layers.

6. A safety blanket for wrapping around a pipeline component, comprising:
    a plurality of flexible inner layers constructed from a high tensile strength material;
    a flexible cover layer encapsulating the inner layers and constructed from a material resistant to degradation from ultraviolet light; and
    a plurality of elongate straps attached to the cover layer and adapted to wrap around the pipeline component and fasten together.

7. The safety blanket of claim 6 wherein the cover layer is water resistant.

8. The safety blanket of claim 6 wherein the internal layers are water resistant.

9. The safety blanket of claim 6 wherein the internal layers are constructed of a para-aramid fibre.

10. The safety blanket of claim 6 wherein the straps are attached to the cover and inner layers by stitching with a para-aramid fibre thread that extends through all the layers.

11. The device of claim 6 wherein the number of internal layers is greater than the number of cover layers.

12. A method of securing a component of a pipeline in the event of explosion or rupture, comprising the steps of:
    providing a blanket having a plurality of high tensile strength inner layers, an outer cover layer, and closure straps;
    wrapping the blanket about the component and securing it with the closure straps to contain debris in the event of explosion or rupture; and protecting the blanket from degradation from ultraviolet light with the cover layer.

* * * * *